United States Patent
Trisno et al.

(10) Patent No.: US 11,894,997 B2
(45) Date of Patent: Feb. 6, 2024

(54) METHODS AND SYSTEMS FOR NETWORK DIAGNOSTIC

(71) Applicant: Nile Global, Inc., Cupertino, CA (US)

(72) Inventors: Tjandra Trisno, San Jose, CA (US); Suresh Katukam, Milpitas, CA (US); Shiv Mehra, Saratoga, CA (US); Lakshmi Narasimha Prasad Bhumarapu, Bangalore (IN)

(73) Assignee: NILE GLOBAL, INC., San Jose, CA (US)

( * ) Notice: Subject to any disclaimer, the term of this patent is extended or adjusted under 35 U.S.C. 154(b) by 174 days.

(21) Appl. No.: 17/465,778

(22) Filed: Sep. 2, 2021

(65) Prior Publication Data
US 2023/0018752 A1    Jan. 19, 2023

Related U.S. Application Data

(60) Provisional application No. 63/221,452, filed on Jul. 13, 2021.

(51) Int. Cl.
*H04L 43/0811* (2022.01)
*H04L 45/745* (2022.01)
*H04L 43/10* (2022.01)

(52) U.S. Cl.
CPC ........ *H04L 43/0811* (2013.01); *H04L 45/745* (2013.01)

(58) Field of Classification Search
CPC . H04L 43/08; H04L 43/0805; H04L 43/0811; H04L 45/74; H04L 45/745
See application file for complete search history.

(56) References Cited

U.S. PATENT DOCUMENTS

| | | | | |
|---|---|---|---|---|
| 9,596,181 | B1* | 3/2017 | Goel | H04L 45/7453 |
| 9,882,784 | B1* | 1/2018 | Lotfi | H04L 67/10 |
| 10,091,112 | B1* | 10/2018 | Sharma | H04L 49/3009 |
| 10,142,860 | B2 | 11/2018 | Jain et al. | |
| 10,516,626 | B1* | 12/2019 | Kodeboyina | H04L 49/25 |
| 11,018,937 | B2* | 5/2021 | Smith | H04L 45/64 |
| 2008/0095061 | A1* | 4/2008 | Hua | H04L 43/10 |
| | | | | 370/252 |
| 2008/0279110 | A1* | 11/2008 | Hart | H04L 43/50 |
| | | | | 370/252 |
| 2011/0202684 | A1* | 8/2011 | Craig | H04L 45/304 |
| | | | | 709/244 |
| 2013/0024649 | A1* | 1/2013 | Guo | H04L 45/54 |
| | | | | 711/E12.059 |
| 2013/0301642 | A1* | 11/2013 | Radhakrishnan | H04L 45/66 |
| | | | | 370/392 |
| 2016/0270133 | A1* | 9/2016 | Ogura | H04W 48/16 |

(Continued)

OTHER PUBLICATIONS

International Search Report and Written Opinion for PCT/US2022/036575 dated Nov. 1, 2022; 11 pgs.

*Primary Examiner* — Jenee Holland
(74) *Attorney, Agent, or Firm* — Loza & Loza, LLP

(57) ABSTRACT

Embodiments of a device and method are disclosed. In an embodiment, a method of network diagnostic of a network deployed at a customer site involves at a cloud server connected to the network deployed at the customer site, collecting connectivity state information of the network deployed at the customer site and at the cloud server, performing a network diagnostic operation based on the connectivity state information.

18 Claims, 8 Drawing Sheets

(56) References Cited

U.S. PATENT DOCUMENTS

| | | | |
|---|---|---|---|
| 2018/0041435 A1* | 2/2018 | Zhang | H04W 60/00 |
| 2018/0367403 A1* | 12/2018 | Harneja | H04L 43/0823 |
| 2019/0014040 A1* | 1/2019 | Yerrapureddy | H04L 45/04 |
| 2019/0058768 A1* | 2/2019 | Feijoo | H04L 67/1001 |
| 2020/0004607 A1 | 1/2020 | Mahajani et al. | |
| 2020/0007584 A1* | 1/2020 | Dixit | H04L 41/5019 |
| 2020/0322250 A1* | 10/2020 | Tappin | H04L 41/0806 |
| 2021/0112009 A1 | 4/2021 | Takashige et al. | |
| 2021/0119889 A1 | 4/2021 | Scahill et al. | |
| 2021/0194803 A1* | 6/2021 | Zolkover | H04L 45/302 |
| 2021/0297313 A1* | 9/2021 | Tamizkar | H04L 45/04 |
| 2021/0377167 A1* | 12/2021 | Tamizkar | H04L 45/3065 |
| 2022/0103415 A1* | 3/2022 | Calixte-Civil | H04L 12/4633 |

\* cited by examiner

METHODS AND SYSTEMS FOR NETWORK DIAGNOSTIC

BACKGROUND

Network management, for example, network diagnostic plays an important role in ensuring that network designs and/or deployments meet customer requirements. Typically, network diagnostics are performed by examining system data such as various systems logs and packet traces in real time in order to reproduce a network issue to identify a problem in the network. However, examining system data in real time to reproduce a network issue can be intrusive and may require manual diagnosis. Therefore, there is a need for network diagnostic technology that can provide a non-intrusive, data driven, and automatable diagnostic process.

SUMMARY

Embodiments of a device and method are disclosed. In an embodiment, a method of network diagnostic of a network deployed at a customer site involves at a cloud server connected to the network deployed at the customer site, collecting connectivity state information of the network deployed at the customer site and at the cloud server, performing a network diagnostic operation based on the connectivity state information. Other embodiments are also described.

In an embodiment, the connectivity state information is represented as time series data.

In an embodiment, the connectivity state information includes at least one of Link Layer Discovery Protocol (LLDP) state information, routing state information, and link layer forwarding state information.

In an embodiment, at the cloud server, performing the network diagnostic operation based on the connectivity state information includes at the cloud server, performing path tracing based on the connectivity state information.

In an embodiment, the connectivity state information is represented as time series data, and at the cloud server, performing path tracing based on the connectivity state information includes at the cloud server, evaluating and tracing a data path through a plurality of network devices of the network based on the time series data.

In an embodiment, at the cloud server, performing path tracing based on the connectivity state information includes determining whether a network device in the network deployed at the customer site executes normally, when it is determined that the network device does not execute normally, determining that the network device is down and a corresponding communications path in the network deployed at the customer site has failed, and when it is determined that the network device executes normally, evaluating a route table of the network device.

In an embodiment, at the cloud server, performing path tracing based on the connectivity state information further includes determining whether or not a corresponding entry is located in the route table of the network device, when it is determined that the corresponding entry is not located in the route table of the network device, determining that there is no available route and the corresponding communications path in the network deployed at the customer site has failed, and when it is determined that the corresponding entry is located in the route table of the network device, determining whether or not multiple matches are found in the route table of the network device.

In an embodiment, at the cloud server, performing path tracing based on the connectivity state information further includes when it is determined that the multiple matches are found in the route table of the network device, selecting one of the multiple matches, and when it is determined that the multiple matches are not found in the route table of the network device, determining whether or not a next hop link is up.

In an embodiment, at the cloud server, performing path tracing based on the connectivity state information further includes when it is determined that the next hop link is down, determining that the corresponding communications path in the network deployed at the customer site has failed, and when it is determined that the next hop link is up, determining whether or not the next hop is an exit network block.

In an embodiment, at the cloud server, performing path tracing based on the connectivity state information further includes when it is determined that the next hop is not the exit network block, finding a next device using LLDP data.

In an embodiment, the method further includes at the cloud server, analyzing at least one of processor utilization and memory utilization of a network device in the network deployed at the customer site.

In an embodiment, the method further includes at the cloud server, analyzing a number of packet errors or discarded packets in the network deployed at the customer site.

In an embodiment, a cloud server for network diagnostic of a network deployed at a customer site includes memory and one or more processors configured to collect connectivity state information of the network deployed at the customer site and perform a network diagnostic operation based on the connectivity state information.

In an embodiment, the connectivity state information is represented as time series data.

In an embodiment, the connectivity state information includes at least one of LLDP state information, routing state information, and link layer forwarding state information.

In an embodiment, the one or more processors are further configured to perform path tracing based on the connectivity state information.

In an embodiment, the connectivity state information is represented as time series data, the one or more processors are further configured to evaluate and trace a data path through a plurality of network devices of the network based on the time series data.

In an embodiment, the one or more processors are further configured to determine whether a network device in the network deployed at the customer site executes normally, when it is determined that the network device does not execute normally, determine that the network device is down and a corresponding communications path in the network deployed at the customer site has failed, and when it is determined that the network device executes normally, evaluate a route table of the network device.

In an embodiment, the one or more processors are further configured to determine whether or not a corresponding entry is located in the route table of the network device, when it is determined that the corresponding entry is not located in the route table of the network device, determine that there is no available route and the corresponding communications path in the network deployed at the customer site has failed, and when it is determined that the corresponding entry is located in the route table of the network device, determine whether or not multiple matches are found in the route table of the network device.

In an embodiment, a method of network diagnostic of a network deployed at a customer site involves at a cloud server connected to the network deployed at the customer site, collecting connectivity state information of the network deployed at the customer site, where the connectivity state information includes LLDP state information, routing state information, and link layer forwarding state information, and where the connectivity state information is represented as time series data, and at the cloud server, performing a network diagnostic operation based on the connectivity state information.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 5 is an example of a resolved path trace screenshot, which may be generated by the path tracing operation depicted in FIG. 4.

FIG. 6 is an example of a link status screenshot, which may be generated by a path health and problem identification operation.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
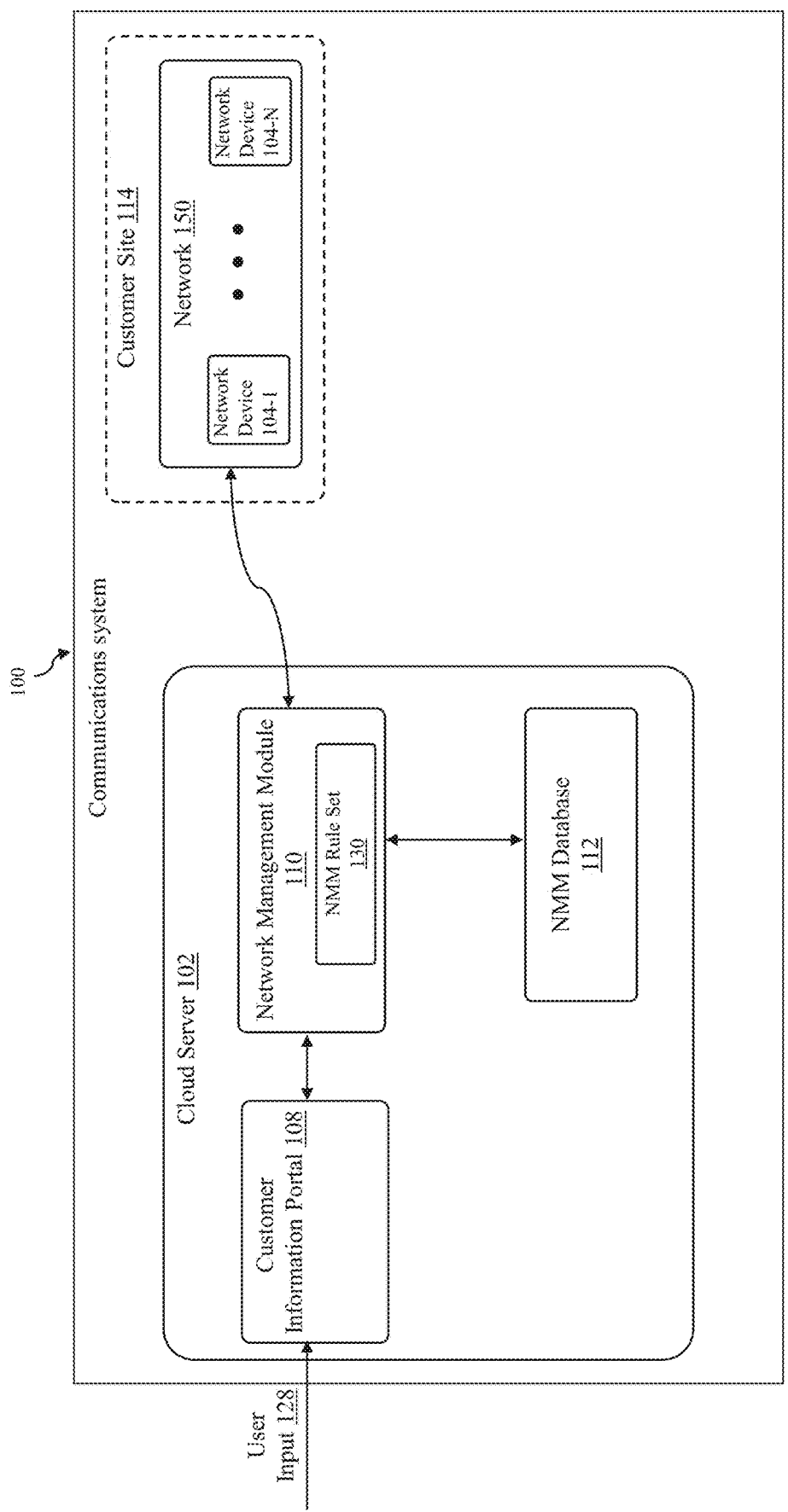
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and a deployed network 150 within a customer site 114. The cloud server and/or the network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a network management service (e.g., a network diagnostic service) to network devices (e.g., the deployed network 150) at the customer site. Because the cloud server can facilitate or perform a network diagnostic service or operation for network devices at the customer site, network diagnostic efficiency can be improved. In addition, because the cloud server can facilitate or perform a network diagnostic service or operation for network devices at the customer site, a user or customer of the customer site can be notified of a network outage. Consequently, network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM module 110, and an NMM database 112 configured to store NMM data. The NMM module, the customer information portal, and/or the NMM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM module, more than one customer information portal, and/or more than one NMM database. In another example, although the NMM module, the customer information portal, and the NMM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM module 110 is configured to facilitate or perform an NMM service (e.g., a network diagnostic service) to network devices (e.g., the deployed network 150) at the customer site 114, for example, using an NMM rule set 130. The NMM rule set 130 may include one or more NMM rules (e.g., network diagnostic rules) for network devices at the customer site 114, for example, for performing an NMM service (e.g., network diagnostic) to network devices at the customer site 114. In some embodiments, the NMM module 110 is configured to generate and/or transmit at least one alert (e.g., a network outage alert or a network throughput alert) regarding a network deployed and/or to be deployed at the customer site or a network operator site, for example, to an administrator or a user or customer (e.g., a layperson such as a worker on-site or an end-user such as an employee) at the customer site 114. In some embodiments, the NMM database 112 is configured to store NMM data for a network deployed and/or to be deployed at the customer site (e.g., a list of network devices deployed or to be deployed at the customer site). In some embodiments, the NMM database 112 is configured to store the at least one NMM alert. Because the NMM module can facilitate or perform network diagnostic for network devices at the customer site, network diagnostic efficiency can be improved. In addition, because the NMM deployment module can facilitate or perform a network diagnostic service or operation for network devices at the customer site, an administrator or a customer can be notified of network conditions or outages. Consequently, network outage or low performance time can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NMM service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N is compatible with Institute of Electrical and Electronics Engineers (IEEE) 802.3 protocol and/or one or more wireless local area network (WLAN) communications protocols, such as IEEE 802.11 protocol. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a laptop, a desktop personal computer (PC), a mobile phone, or other wireless device that supports at least one WLAN communications protocol (e.g., an IEEE 802.11 protocol)).

Figure 2:
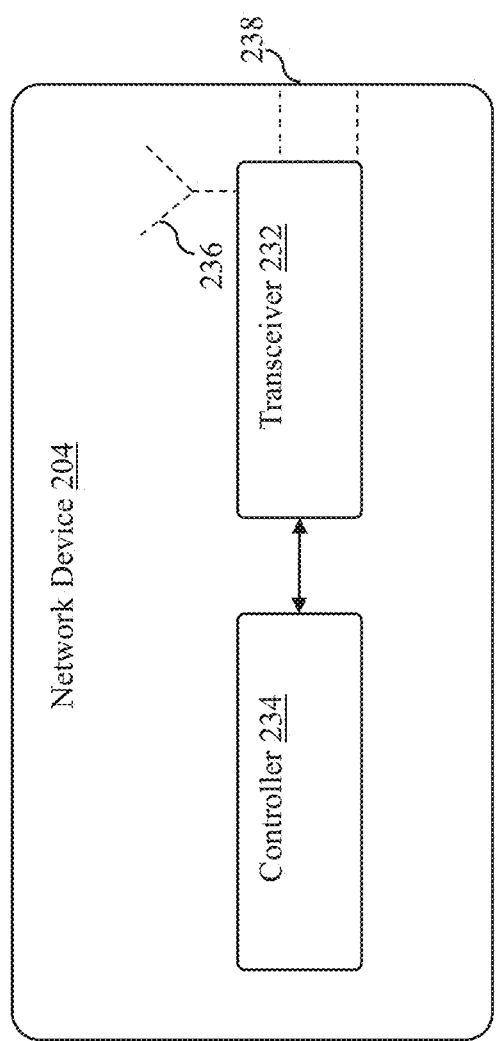
FIG. 2 depicts an embodiment of a network device of the communications system depicted in FIG. 1.

FIG. 2 depicts an embodiment of a network device 204 of the communications system depicted in FIG. 1. The network device 204 may be an embodiment of a network device that is included in the deployed network 150 depicted in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch, a gateway, an access switch, a wireless access point, or a sensor, described in more detail with reference to FIG. 3. In the embodiment depicted in FIG. 2, a network device 204 includes a wireless and/or wired transceiver 232, a controller 234 operably connected to the transceiver 232, at least one optional antenna 236 operably connected to the transceiver 232, and at least one optional network port 238 operably connected to the transceiver 232. In some embodiments, the transceiver 232 includes a physical layer (PHY) device. The transceiver 232 may be any suitable type of transceiver. For example, the transceiver 232 may be a short-range communications transceiver (e.g., a Bluetooth transceiver) or a WLAN transceiver (e.g., a transceiver compatible with an IEEE 802.11 protocol). In some embodiments, the network device 204 includes multiple transceivers, for example, a short-range communications transceiver (e.g., a Bluetooth transceiver) and a WLAN transceiver (e.g., a transceiver compatible with an IEEE 802.11 protocol). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store network information relevant to the network device 204. For example, the controller 234 may be configured to obtain and/or store network information (e.g., routing information such as a routing table) relevant to the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a DS, a HE or gateway, an AS, a wireless AP, or a wireless sensor that wirelessly connects to a wireless AP.

Figure 3:
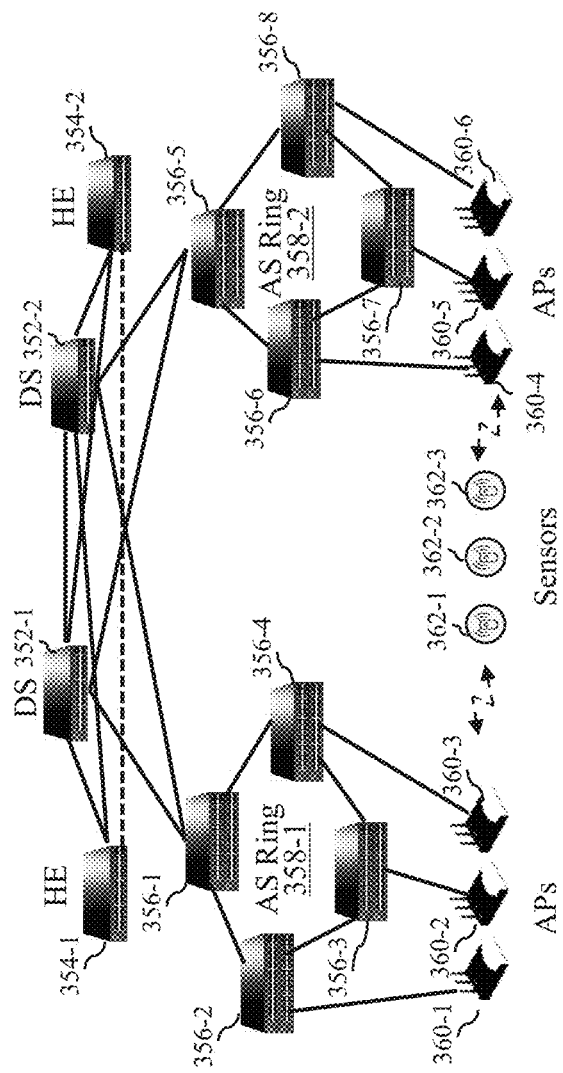
FIG. 3 depicts an embodiment of a network that can be deployed at a customer site.

FIG. 3 depicts an embodiment of a network 350 that can be deployed at the customer site 114. The network 350 depicted in FIG. 3 is one possible embodiment of the deployed network 150 at the customer site 114 depicted in FIG. 1. However, the deployed network 150 at the customer site 114 depicted in FIG. 1 is not limited to the embodiment shown in FIG. 3. In some embodiments, the network 350 is a basic building block for providing connectivity as a service and is a replicable block that can be scaled (e.g., expanded) to meet any deployment need. In the embodiment depicted in FIG. 3, the network 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of optional access switches (ASs) 356-1, 356-2, 356-3, 356-4, 356-5, 356-6, 356-7, 356-8 connected in rings 358-1, 358-2 that can interact with lower level devices (e.g., wireless APs), a number of wireless APs 360-1, 360-2, 360-3, 360-4, 360-5, 360-6 connected to the ASs, and a number of wireless sensors 362-1, 362-2, 362-3 that wirelessly connect to the wireless APs and are configured to measure and monitor network information at the customer site 114. In some embodiments, the network 350 does not include access switches and the wireless APs are directly connected to the DS 352-1 and/or the DS 352-2. In some embodiments, at least one of the DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, and the wireless sensors 362-1, 362-2, 362-3 depicted in FIG. 3 is implemented as the network device 204 depicted in FIG. 2.

In some embodiments, the cloud server 102 includes memory and one or more processors configured to collect connectivity state information of the network deployed at the customer site and perform a network diagnostic operation based on the connectivity state information. In some embodiments, the connectivity state information is represented as time series data. In some embodiments, the connectivity state information includes at least one of Link Layer Discovery Protocol (LLDP) state information, routing state information, and link layer forwarding state information. In some embodiments, the one or more processors are further configured to perform path tracing based on the connectivity state information. In some embodiments, the connectivity state information is represented as time series data, and the one or more processors are further configured to evaluate and trace a data path through a plurality of network devices of the network based on the time series data. In some embodiments, the one or more processors are further configured to determine whether a network device in the network deployed at the customer site executes normally, when it is determined that the network device does not execute normally, determine that the network device is down and a corresponding communications path in the network deployed at the customer site has failed, and when it is determined that the network device executes normally, evaluate a route table of the network device. In some embodiments, the one or more processors are further configured to determine whether or not a corresponding entry is located in the device route table of the network device, when it is determined that the corresponding entry is not located in the route table of the network device, determine that there is no available route and the corresponding communications path in the network deployed at the customer site has failed, and when it is determined that the corresponding entry is located in the route table of the network device, determine whether or not multiple matches are found in the route table of the network device. In some embodiments, the one or more processors are further configured to, when it is determined that the multiple matches are found in the route table of the network device, select one of the multiple matches, and when it is determined that the multiple matches are not found in the route table of the network device, determine whether or not a next hop link is up. In some embodiments, the one or more processors are further configured to, when it is determined that the next hop link is down, determine that the corresponding communications path in the network deployed at the customer site has failed, and when it is determined that the next hop link is up, determine whether or not the next hop is an exit network block. In some embodiments, the one or more processors are further configured to, when it is determined that the next hop is not the exit network block, find a next device using LLDP data. In some embodiments, the one or more processors are further configured to analyze at least one of processor utilization and memory utilization of a network device in the network deployed at the customer site. In some embodiments, the one or more processors are further configured to analyze a number of packet errors or discarded packets in the network deployed at the customer site.

In some embodiments, the cloud server 102 (e.g., one or more processors of the cloud server 102) is configured to collect and analyze relevant telemetry data of the network 150 that is deployed at the customer site 114, which enables network diagnostic to be done at any time and reduce or even eliminate the need to reproduce a network issue, which is typical of real time diagnostic. Consequently, the communications system 100 allows both a continuous network diagnostic process and an after the fact, non-intrusive, data driven and automatable network diagnostic process. In some embodiments, the cloud server 102 (e.g., one or more processors of the cloud server 102) is configured to collect connectivity state information, such as LLDP state information, routing state information, and/or link layer forwarding state information from the one or more network devices 104-1, . . . , 104-N. In some embodiments, the collected connectivity state information is represented as time series data. In an embodiment, time series data is data of the network 150 that is collected, indexed, listed, or graphed at different points in time. In some embodiments, a time series is a sequence taken at successive equally spaced points in time. In some embodiments, the cloud server 102 (e.g., one or more processors of the cloud server 102) is configured to perform a network diagnostic operation (e.g., packet tracing) using at least one of the collected time series state data. In some embodiments, the cloud server 102 (e.g., one or more processors of the cloud server 102) is configured to determine path health using the time series metric data of one or more identified network devices and/or communications links. In some embodiments, to enable path tracing determination, collected connectivity and device state and metric information includes routing information, link state information, wireless state information, and/or LLDP data. For example, a routing table of each of the network devices 104-1, . . . , 104-N includes one or more rows and/or columns of route destination, prefix, next hop, and/or cost. An outgoing interface may be collected, for example, by the cloud server 102, from each network device. In some embodiments, link states and ARP tables are captured, for example, by the cloud server 102, to provide link status, interface IP address, and/or additional next hop interface information. In some embodiments, in case of a wireless path, wireless states of access points are also collected, for example, by the cloud server 102, to identify a path entry point and whether the traffic is tunneled to a wireless controller (e.g., a DS, a HE, or an AS). In some embodiments, LLDP data provides a network device's neighborhood information, for example, the identity of a neighbor device of the network device, and a communications link that the network device is connected to. A network topology may be derived from the neighborhood information, for example, by the cloud server 102. Given a source and a destination, a packet path can be determined, for example, by the cloud server 102, using collected time series data at any time interval of interest, providing the ability to non-intrusively analyzing network states after the time of incident and removing the need for intrusive and time-consuming network issue reproduction.

In some embodiments, the cloud server 102 (e.g., one or more processors of the cloud server 102) is configured to perform path tracing using network state time series data. For example, the cloud server 102 (e.g., one or more processors of the cloud server 102) is configured to evaluate and trace a data path through the one or more network devices 104-1, . . . , 104-N of the deployed network 150 based on network state time series data. In some embodiments, the cloud server 102 (e.g., one or more processors of the cloud server 102) is configured to, given a source and a destination, resolve IP addresses of the source and the destination. The source can be any network element (e.g., one of the network devices 104-1, . . . , 104-N) in the deployed network 150 or an identifiable entry point (such as a wireless access point). The destination can be any element in the deployed network 150 or an IP address (e.g., a public IP address). In some embodiments, a network element to IP address resolution is achieved by using the network element's link state time series information to identify its own IP address. In some embodiments, the cloud server 102 (e.g., one or more processors of the cloud server 102) is configured to, if/when a source device is a wireless device or client, identify an entry access point and a tunnel through which the source device traverses using wireless client state time series data. In some embodiments, the cloud server 102 is configured to, if/when there is a redundant element such as a wireless controller, determine an active element from the redundant element's device state time series data.

Figure 4:
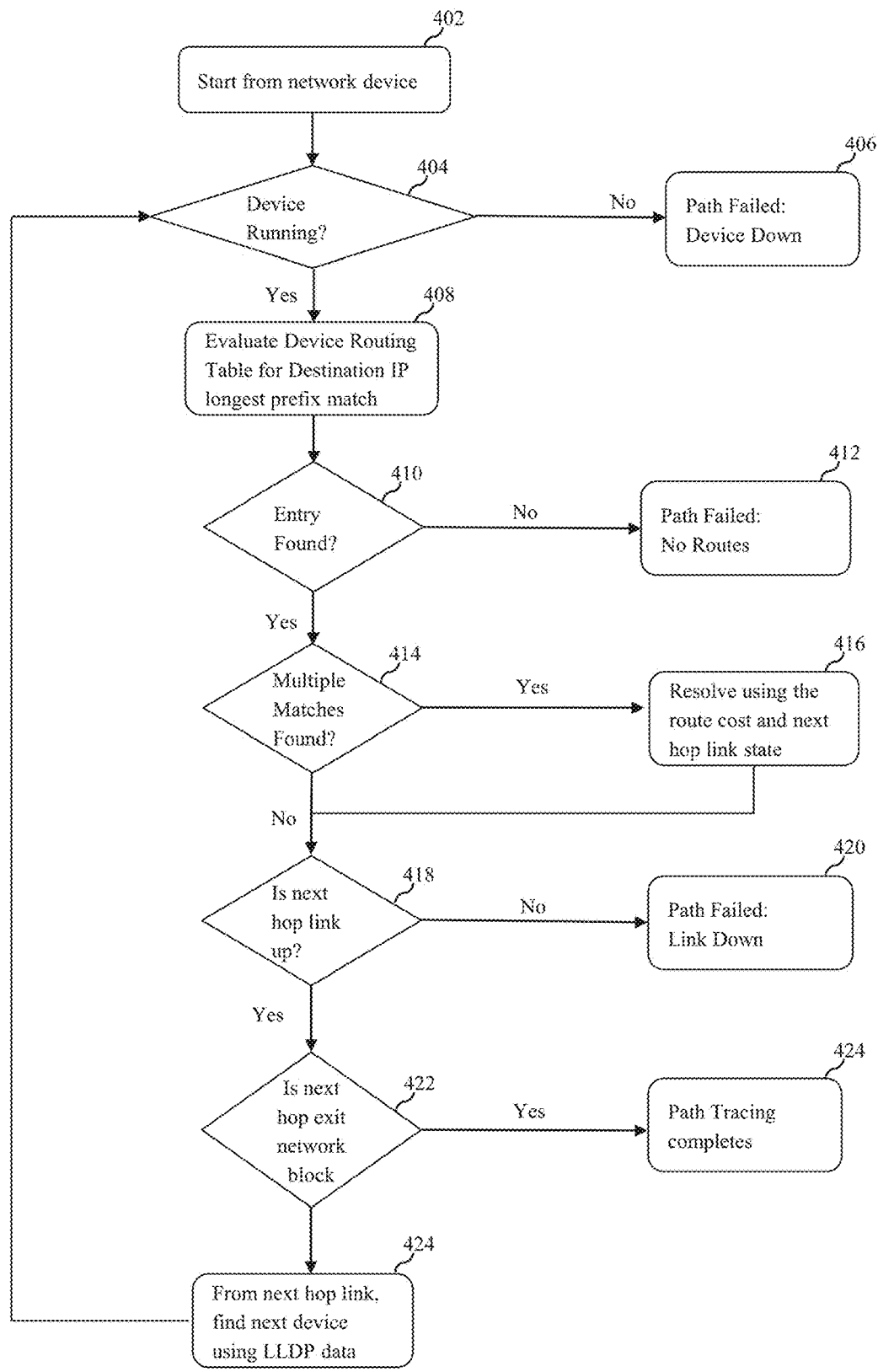
FIG. 4 is a flow chart that illustrates an exemplary path tracing operation that can be performed by a cloud server of the communications system depicted in FIG. 1.

FIG. 4 is a flow chart that illustrates an exemplary path tracing operation that can be performed by the cloud server 102 of the communications system 100 depicted in FIG. 1. In the exemplary path tracing operation, a path tracing algorithm is implemented to identify one or more device and/or link failures and is executable by, for example, one or more processors of the cloud server 102. At step 402, the path tracing operation starts from a network device. At step 404, a determination regarding whether the network device is running or executing normally is made, for example, by the cloud server 102. If/when the cloud server 102 determines that the network device is not running or executing normally, the cloud server 102 determines that the network device is down and the path has failed (i.e., is in a failed state) at step 406.

If/when the cloud server 102 determines that the network device is running or executing normally, the cloud server 102 evaluates a device route table of the network device to locate a corresponding entry, for example, for matching of the longest prefix of a destination IP at step 408. The cloud server 102 determines whether or not a corresponding entry is located in the device route table of the network device at step 410. If/when the cloud server 102 determines that a corresponding entry is not located in the device route table of the network device at step 410, the cloud server 102 determines that there is no available route and the path has failed (i.e., is in a failed state) at step 412.

If/when the cloud server 102 determines that a corresponding entry is located in the device route table of the network device at step 410, the cloud server 102 determines whether or not multiple matches are found (e.g., multiple entries are located in the device route table of the network device) at step 414. If/when the cloud server 102 determines that multiple matches are found (e.g., multiple entries are located in the device route table of the network device) at step 414, the cloud server 102 can resolve the multiple match situation, for example, using one or more criteria at step 416. For example, the cloud server 102 selects one of the multiple matches based on route cost and/or next hop link state.

If/when the cloud server 102 determines that multiple matches are not found (e.g., multiple entries are not located in the device route table of the network device) at step 414, the cloud server 102 determines whether or not the next hop link is up at step 418. If/when the cloud server 102 determines that the next hop link is not up (i.e., down) at step 420, the cloud server 102 determines that the next hop link is down and the path has failed (i.e., is in a failed state) at step 420.

If/when the cloud server 102 determines that the next hop link is up at step 420, the cloud server 102 determines whether or not the next hop is an exit network block at step 422. If/when the cloud server 102 determines that the next hop is an exit network block at step 422, the path tracing operation completes at step 424. If/when the cloud server 102 determines that the next hop is not an exit network block at step 422, the cloud server 102 finds a next device from the next hop link using LLDP data at step 424 and goes back to step 404.

Figure 5:
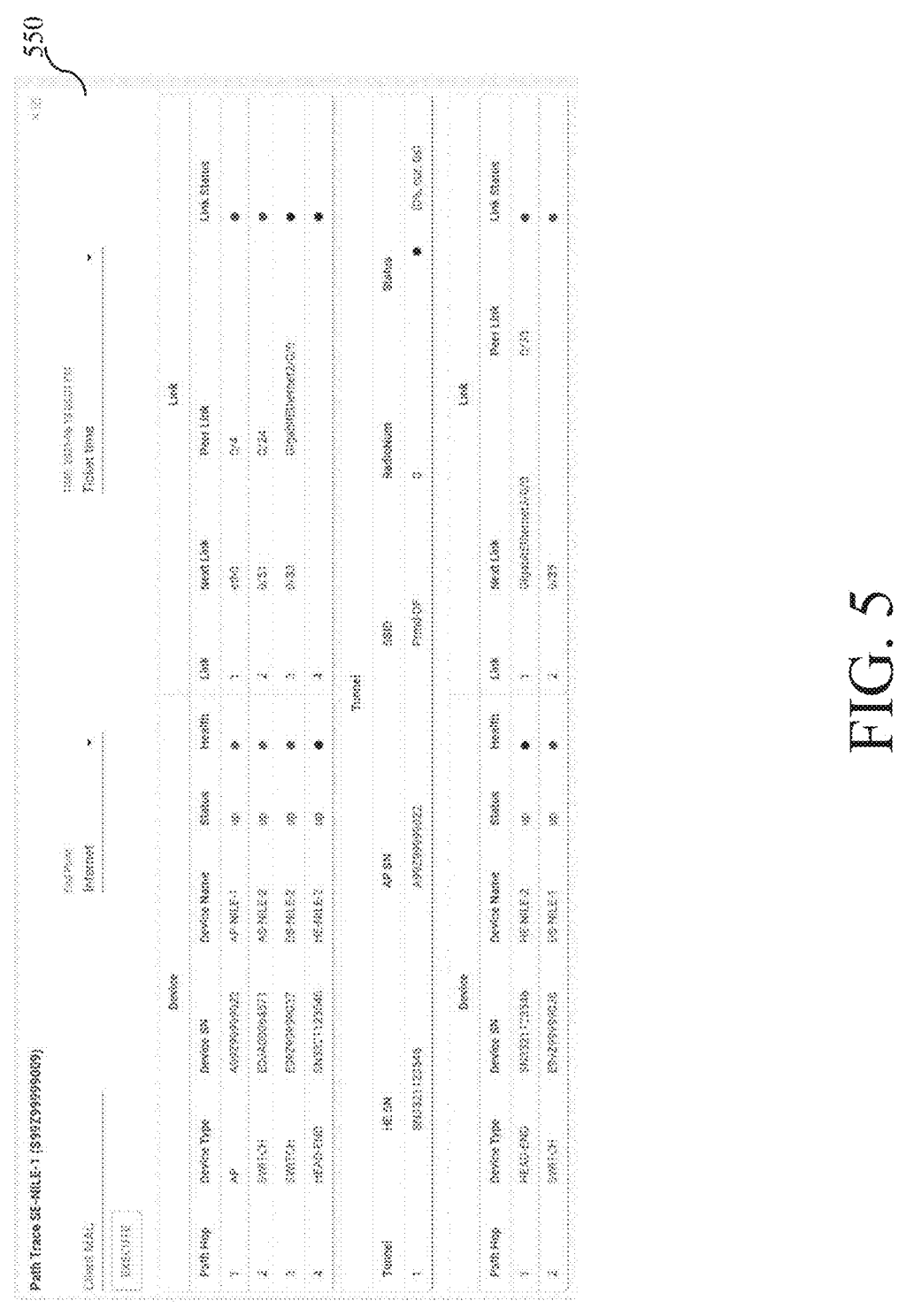

FIG. 5 is an example of a resolved path trace screenshot 550, which may be generated by the path tracing operation depicted in FIG. 4. In the path trace screenshot 550 shown in FIG. 5, a path trace SE-NILE-1 includes four path hops with various health statuses and a tunnel. However, the number of path hops that can be included in a path trace is not limited to the example shown in FIG. 5.

Figure 6:
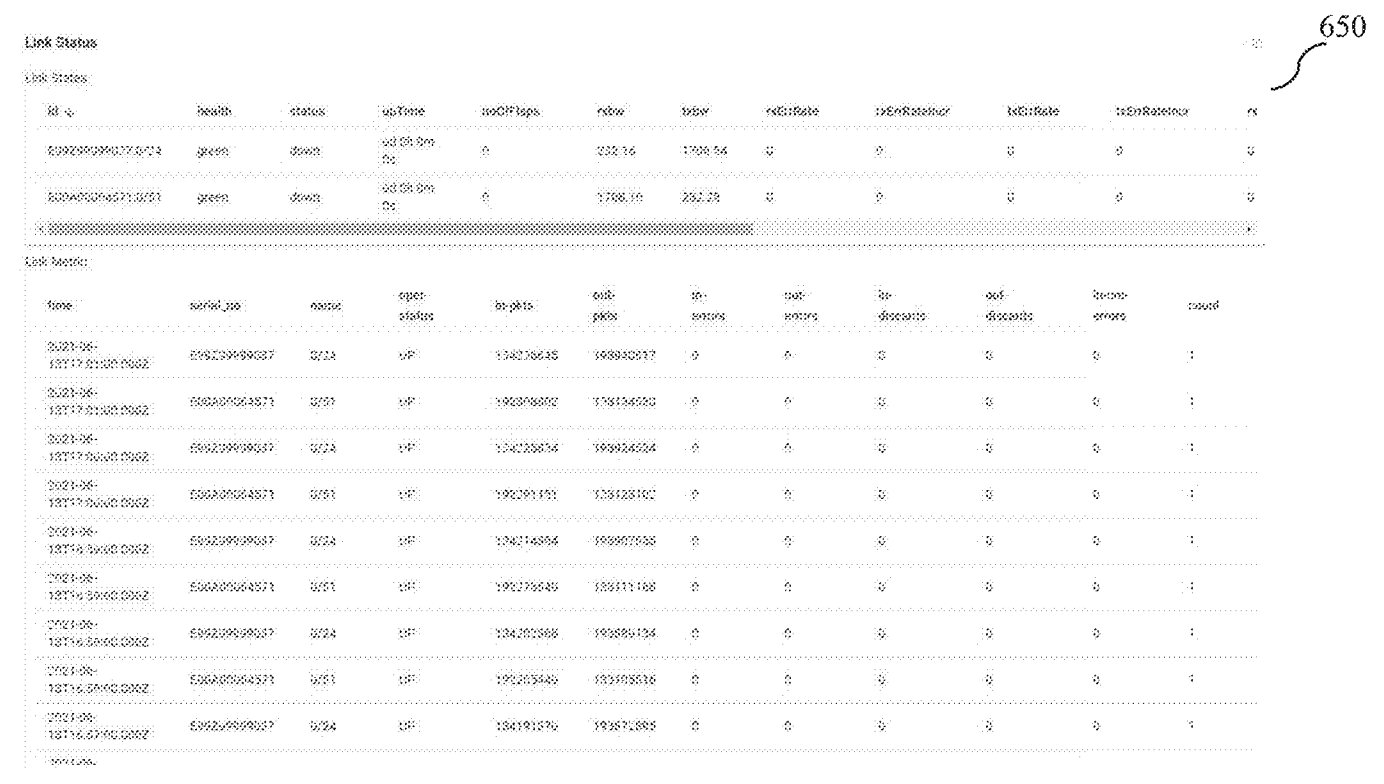

In some embodiments, the cloud server 102 (e.g., one or more processors of the cloud server 102) is configured to perform a path health and problem identification operation. For example, once the path tracing operation is complete, hard failures such as routing issues, device or link hard failures are identified. In some embodiments, the cloud server 102 (e.g., one or more processors of the cloud server 102) is configured to identify one or more soft failures that can cause network issues, for example, by analyzing corresponding time series metrics such as device health information, route tables, and/or link state and health information. In some embodiments, device health information includes CPU utilization and/or memory and buffer utilization. The device health information can be used to identify a potential soft bottleneck that causes resource overload. In some embodiments, route tables contain frequent changes in route cost or route existence that indicate route flaps. In some embodiments, link state and health information includes packet error counters that indicate wiring issues or interface device malfunctions, and excessively received discarded packets that may indicate routing issues or system resource overload. In some embodiments, a link status includes frequent changes that indicate interface flaps. In some embodiments, unbalanced receiver and transmitter counters between two end-points of a communications link indicates packets that are lost due to buffer overrun. In some embodiments, a health indicator based on the severity of network issues is also presented in the path tracing output, which provides an operator a quick check of the path health within the network 150. In some embodiments, when the time series data are available, a further automated analysis is performed and presented to an operator as well, which further improves operation efficiency. FIG. 6 is an example of a link status screenshot 650, which may be generated by a path health and problem identification operation. In the link status screenshot in FIG. 6, eleven link statuses (e.g., two links states and nine link metrics) are shown. However, the number of link statuses is not limited to the example shown in FIG. 6.

Figure 7:
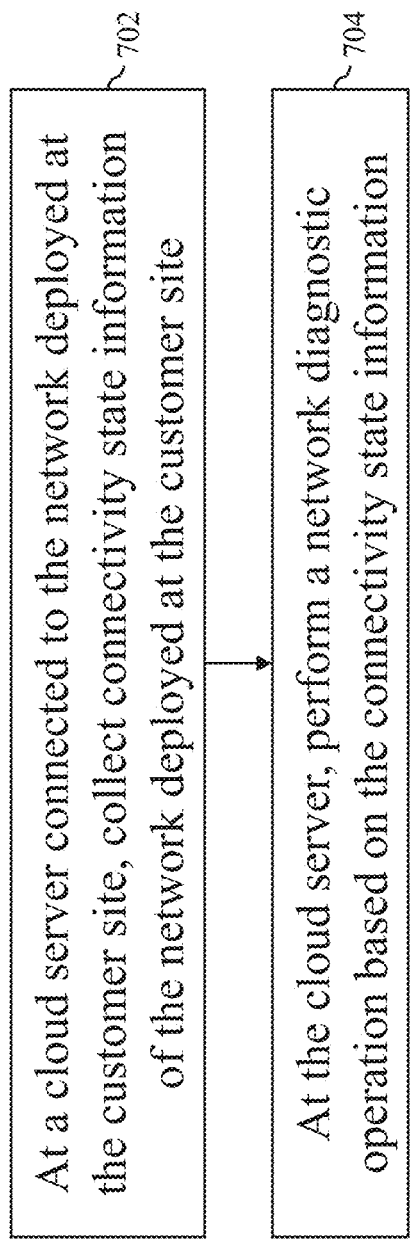
FIG. 7 is a process flow diagram of a method for of network diagnostic of a network deployed at a customer site accordance to an embodiment of the invention.

FIG. 7 is a process flow diagram of a method for network diagnostic of a network deployed at a customer site accordance to an embodiment of the invention. According to the method, at block 702, at a cloud server connected to the network deployed at the customer site, connectivity state information of the network deployed at the customer site is collected. At block 704, at the cloud server, a network diagnostic operation is performed based on the connectivity state information. In some embodiments, the connectivity state information is represented as time series data. In some embodiments, the connectivity state information includes at least one of LLDP state information, routing state information, and link layer forwarding state information. In some embodiments, at the cloud server, performing the network diagnostic operation based on the connectivity state information includes at the cloud server, performing path tracing based on the connectivity state information. In some embodiments, the connectivity state information is represented as time series data, and at the cloud server, performing path tracing based on the connectivity state information includes at the cloud server, evaluating and tracing a data path through a plurality of network devices of the network based on the time series data. In some embodiments, at the cloud server, performing path tracing based on the connectivity state information includes determining whether a network device in the network deployed at the customer site executes normally, when it is determined that the network device does not execute normally, determining that the network device is down and a corresponding communications path in the network deployed at the customer site has failed, and when it is determined that the network device executes normally, evaluating a route table of the network device. In some embodiments, at the cloud server, performing path tracing based on the connectivity state information further includes determining whether or not a corresponding entry is located in the route table of the network device, when it is determined that the corresponding entry is not located in the route table of the network device, determining that there is no available route and the corresponding communications path in the network deployed at the customer site has failed, and when it is determined that the corresponding entry is located in the route table of the network device, determining whether or not multiple matches are found in the route table of the network device. In some embodiments, at the cloud server, performing path tracing based on the connectivity state information further includes when it is determined that the multiple matches are found in the route table of the network device, selecting one of the multiple matches and when it is determined that the multiple matches are not found in the route table of the network device, determining whether or not a next hop link is up. In some embodiments, at the cloud server, performing path tracing based on the connectivity state information further includes when it is determined that the next hop link is down, determining that the corresponding communications path in the network deployed at the customer site has failed and when it is determined that the next hop link is up, determining whether or not the next hop is an exit network block. In some embodiments, at the cloud server, performing path tracing based on the connectivity state information further includes when it is determined that the next hop is not the exit network block, finding a next device using LLDP data. In some embodiments, the method further includes at the cloud server, analyzing at least one of processor utilization and memory utilization of a network device in the network deployed at the customer site. In some embodiments, the method further includes at the cloud server, analyzing a number of packet errors or discarded packets in the network deployed at the customer site. The cloud server may be similar to, the same as, or a component of the cloud server 102 depicted in FIG. 1. The network may be similar to, the same as, or a component of the network 150 depicted in FIG. 1. The customer site may be similar to, the same as, or a component of the customer site 114 depicted in FIG. 1.

Figure 8:
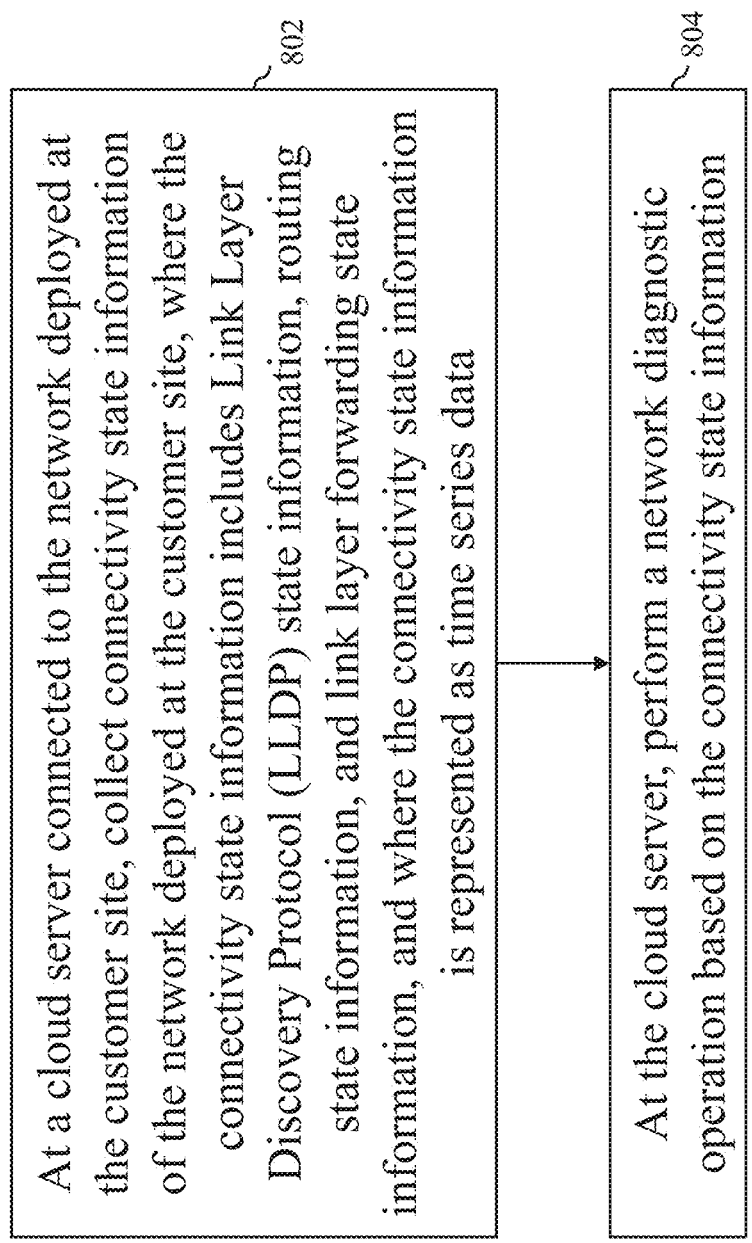
FIG. 8 is a process flow diagram of a method for of network diagnostic of a network deployed at a customer site accordance to another embodiment of the invention.

FIG. 8 is a process flow diagram of a method for network diagnostic of a network deployed at a customer site accordance to another embodiment of the invention. According to the method, at block 802, at a cloud server connected to the network deployed at the customer site, connectivity state information of the network deployed at the customer site is collected. The connectivity state information includes LLDP state information, routing state information, and link layer forwarding state information, and the connectivity state information is represented as time series data. At block 804, at the cloud server, a network diagnostic operation is performed based on the connectivity state information. The cloud server may be similar to, the same as, or a component of the cloud server 102 depicted in FIG. 1. The network may be similar to, the same as, or a component of the network 150 depicted in FIG. 1. The customer site may be similar to, the same as, or a component of the customer site 114 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of network diagnostic of a network deployed at a customer site, the method comprising:
   at a cloud server connected to the network deployed at the customer site, collecting connectivity state information of the network deployed at the customer site, wherein the connectivity state information comprises Link Layer Discovery Protocol (LLDP) state information, routing state information, link layer forwarding state information, and wireless state information of a plurality of wireless devices to identify a path entry point and wireless traffic tunnel configuration; and
   at the cloud server, performing a network diagnostic operation based on the connectivity state information.

2. The method of claim 1, wherein the connectivity state information is represented as time series data.

3. The method of claim 1, wherein at the cloud server, performing the network diagnostic operation based on the connectivity state information comprises at the cloud server, performing path tracing based on the connectivity state information.

4. The method of claim 3, wherein the connectivity state information is represented as time series data, and wherein at the cloud server, performing path tracing based on the connectivity state information comprises at the cloud server, evaluating and tracing a data path through a plurality of network devices of the network based on the time series data.

5. The method of claim 3, wherein at the cloud server, performing path tracing based on the connectivity state information comprises:
   determining whether a network device in the network deployed at the customer site executes normally;
   when it is determined that the network device does not execute normally, determining that the network device is down and a corresponding communications path in the network deployed at the customer site has failed; and
   when it is determined that the network device executes normally, evaluating a route table of the network device.

6. The method of claim 5, wherein at the cloud server, performing path tracing based on the connectivity state information further comprises:
   determining whether or not a corresponding entry is located in the route table of the network device;
   when it is determined that the corresponding entry is not located in the route table of the network device, determining that there is no available route and the corresponding communications path in the network deployed at the customer site has failed; and
   when it is determined that the corresponding entry is located in the route table of the network device, determining whether or not multiple matches are found in the route table of the network device.

7. The method of claim 6, wherein at the cloud server, performing path tracing based on the connectivity state information further comprises:
   when it is determined that the multiple matches are found in the route table of the network device, selecting one of the multiple matches; and
   when it is determined that the multiple matches are not found in the route table of the network device, determining whether or not a next hop link is up.

8. The method of claim 7, wherein at the cloud server, performing path tracing based on the connectivity state information further comprises:
- when it is determined that the next hop link is down, determining that the corresponding communications path in the network deployed at the customer site has failed; and
- when it is determined that the next hop link is up, determining whether or not the next hop is an exit network block.

9. The method of claim 8, wherein at the cloud server, performing path tracing based on the connectivity state information further comprises:
- when it is determined that the next hop is not the exit network block, finding a next device using Link Layer Discovery Protocol (LLDP) data.

10. The method of claim 1, further comprising at the cloud server, analyzing at least one of processor utilization and memory utilization of a network device in the network deployed at the customer site.

11. The method of claim 1, further comprising at the cloud server, analyzing a number of packet errors or discarded packets in the network deployed at the customer site.

12. A cloud server for network diagnostic of a network deployed at a customer site, the cloud server comprising:
- memory; and
- one or more processors configured to:
  - collect connectivity state information of the network deployed at the customer site, wherein the connectivity state information comprises Link Layer Discovery Protocol (LLDP) state information, routing state information, link layer forwarding state information, and wireless state information of a plurality of wireless devices to identify a path entry point and wireless traffic tunnel configuration; and
  - perform a network diagnostic operation based on the connectivity state information.

13. The cloud server of claim 12, wherein the connectivity state information is represented as time series data.

14. The cloud server of claim 12, wherein the one or more processors are further configured to perform path tracing based on the connectivity state information.

15. The cloud server of claim 14, wherein the connectivity state information is represented as time series data, wherein the one or more processors are further configured to evaluate and trace a data path through a plurality of network devices of the network based on the time series data.

16. The cloud server of claim 12, wherein the one or more processors are further configured to:
- determine whether a network device in the network deployed at the customer site executes normally;
- when it is determined that the network device does not execute normally, determine that the network device is down and a corresponding communications path in the network deployed at the customer site has failed; and
- when it is determined that the network device executes normally, evaluate a route table of the network device.

17. The cloud server of claim 16, wherein the one or more processors are further configured to:
- determine whether or not a corresponding entry is located in the route table of the network device;
- when it is determined that the corresponding entry is not located in the route table of the network device, determine that there is no available route and the corresponding communications path in the network deployed at the customer site has failed; and
- when it is determined that the corresponding entry is located in the route table of the network device, determine whether or not multiple matches are found in the route table of the network device.

18. A method of network diagnostic of a network deployed at a customer site, the method comprising:
- at a cloud server connected to the network deployed at the customer site, collecting connectivity state information of the network deployed at the customer site, wherein the connectivity state information comprises Link Layer Discovery Protocol (LLDP) state information, routing state information, link layer forwarding state information, and wireless state information of a plurality of wireless devices to identify a path entry point and wireless traffic tunnel configuration, and wherein the connectivity state information is represented as time series data; and
- at the cloud server, performing a network diagnostic operation based on the connectivity state information.

* * * * *